(12) United States Patent
Whitten et al.

(10) Patent No.: US 7,627,753 B2
(45) Date of Patent: Dec. 1, 2009

(54) SECURE DIGITAL DATA FORMAT AND CODE ENFORCED POLICY

(75) Inventors: Jon Marcus Randall Whitten, Sammamish, WA (US); Tracy Clayton Sharpe, Seattle, WA (US); Yasser B. Asmi, Redmond, WA (US); Jonathan E. Lange, Bellevue, WA (US); Christopher Michael Pirich, Seattle, WA (US); Jonathan Gerald Thomason, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 10/101,999

(22) Filed: Mar. 19, 2002

(65) Prior Publication Data

US 2003/0182574 A1  Sep. 25, 2003

(51) Int. Cl.
*H04L 29/06* (2006.01)
*H04L 9/32* (2006.01)
(52) U.S. Cl. .................................. 713/161; 713/181
(58) Field of Classification Search ................ None
See application file for complete search history.

(56) References Cited

U.S. PATENT DOCUMENTS

| | | | | |
|---|---|---|---|---|
| 5,643,086 A * | 7/1997 | Alcorn et al. | ............... | 463/29 |
| 5,850,451 A * | 12/1998 | Sudia | ............... | 380/286 |
| 6,105,134 A * | 8/2000 | Pinder et al. | ............... | 713/170 |
| 6,468,160 B2 * | 10/2002 | Eliott | ............... | 463/43 |
| 6,968,058 B1 * | 11/2005 | Kondoh et al. | ............... | 380/200 |
| 6,986,046 B1 * | 1/2006 | Tuvell et al. | ............... | 713/171 |
| 7,003,667 B1 * | 2/2006 | Slick et al. | ............... | 713/182 |
| 7,117,365 B1 * | 10/2006 | Rump et al. | ............... | 713/176 |
| 2002/0077177 A1 * | 6/2002 | Elliott | ............... | 463/40 |
| 2002/0144154 A1 * | 10/2002 | Tomkow | ............... | 713/201 |
| 2003/0070166 A1 * | 4/2003 | Johnson | ............... | 725/28 |
| 2004/0064334 A1 * | 4/2004 | Nye | ............... | 705/1 |
| 2005/0091501 A1 * | 4/2005 | Osthoff et al. | ............... | 713/181 |

FOREIGN PATENT DOCUMENTS

EP  1346755  9/2003

OTHER PUBLICATIONS

Osthoff et al., Provisional U.S. Appl. No. 60/350,670, filed Jan. 22, 2002.*

(Continued)

*Primary Examiner*—Matthew B Smithers
*Assistant Examiner*—Nadia Khoshnoodi
(74) *Attorney, Agent, or Firm*—Lee & Hayes, PLLC

(57) ABSTRACT

Authenticity of digital data, security policies, and usage of game software are enforced on a game console. When the software is secured prior to distribution on media, a private key is used to encrypt a header digest that includes a digest of each section of the software and information specifying a region, a rating, and media type of the software. A hashing algorithm is applied to produce the digests. On the game console, a public key is used to decrypt the header digest for comparison to a hash of the header. A digest of each section of digital data is computed and compared to the corresponding digest in the header to authenticate the data. The console will not execute the software unless the parameters in the header information match those stored in the console and the computed digests for each section match those in the header on the medium.

39 Claims, 8 Drawing Sheets

OTHER PUBLICATIONS

Federal Information Processing Standards. 1995. Publication No. 180-1 Announcing the Standard for *Secure Hash Standard*. 16 pp. Available http://www.itl.nist.gov/fibspubs/fip180-1.htm.

U.S. Department of Commerce/National Institute of Standards and Technology. Federal Information Processing Standards. 2000. Publication No. 186-2. *Digital Signature Standard (DDS)*. 70 pp.

Microsoft Corporation. 2002 *Technologies & Tools > Digital Rights Management >Architecture of DRM*. 3 pp. Available http://www.microsoft.com/windows/windowsmedia/wm7/drm/architecture.asp.

RSA Security. 2002. News: *Sony Computer Entertainment Inc. and RSA Security Partner to Enable Secure Internet Entertainment and Commerce on PlayStation®2*. 2 pp.

"Verisign™ CPS, Passage" Verisign CPA, Examiner, Examiner, May 1997 pp. 1-115, XP002934610 paragraph '08.1.

Anon/Verisign: "Software Publisher Digital IDs for Microsoft Authenticode Technology" Online. 2004, pp. 1-6, XP002289494, Retrieved from the Internet: URL:http://www.verisign.com/au/developer/msauthenticode.shtml. Retrieved Jul. 22, 2004.

Becker, David. "Hackers, programmers "improve" Xbox". Online. Dec. 12, 2001, pp. 1-5, XP002289495. Retrieved from the Internet: URL:http://news.com/Hackers,+programmers+"improve"+Xbox/2100-1040_3-276907.html?tag=st.rn. Retrieved on Jul. 22, 2004.

Huang, Andrew. "Keeping secrets in Hardware: the Microsoft XBox Case Study" AI Memo, May 26, 2002 (2002-505-26) pp. 1-15, XP002289496 Cambridge MA.

\* cited by examiner

SECURE DIGITAL DATA FORMAT AND CODE ENFORCED POLICY

FIELD OF THE INVENTION

This invention generally relates to validating digital data before enabling its use, and more particularly, to ensuring that security policies are enforced regarding the use of the digital data, where the security policies ensure the source and validity of the digital data.

BACKGROUND OF THE INVENTION

The personal computer provides a platform on which anyone willing to invest the effort in programming can write programs that can carry out almost any desired function, limited only by the constraints of the programming language, the operating environment, and the hardware on which the program is executed. The manufacturers of personal computers and those providing the operating systems and programming tools place little restriction on how a user chooses to use their respective products. However, there are instances where it may be important to restrict how computing devices are used. In the broadest sense, a computing device may be any device that includes a processor that executes machine instructions stored in a memory to perform some function. Thus, a computing device can have a dedicated function, or may be very general in functionality, just as a typical personal computer is.

One type of computing device that is similar in some ways to a personal computer, yet is more specialized in its primary function, is a game console. Although game consoles can often perform other functions, their primary function is to execute machine instructions to enable one or more users to play various types of games. The companies that produce game consoles have a substantial interest in controlling various aspects of any game software that is executed on their game consoles. For example, they will want to ensure that the quality of the game software meet certain specifications. Since the manufacturers of game consoles typically license other companies to produce game software that is usable on their game consoles, it is preferable to preclude unlicensed software from being used on the game console. Aside from the loss of revenue that would result if unlicensed software is played on a game console, there is also an issue of maintaining quality control over software that is played on the game console. Also, it will be important to ensure that software licensed for use on a game console has not been modified after it was approved for distribution and released to the public. Without such controls being applied, game software might be "hacked" to add pornography or other features or functionality that was not included in the authorized software when it was originally approved for distribution by the software company under license from the maker of the game console. In addition, the game console should be capable of enforcing limitations regarding geographic regions associated with a game console that preclude playing game software licensed for one geographic region on a game console sold for use in a different region.

Other policies that should be enforced on a game console relate to classifications of game software based upon its level of violence, language used, sexual content, and other criteria. The Entertainment Software Rating Board (ESRB) is an organization that reviews and rates game software and categorizes the software by assigning it an age group category for which the game software is believed to be suitable. These age group categories include: "Everyone" (suitable for all age groups), "Adult" (ages 18 and older), "Mature" (ages 17 and older), "Teen" (ages 13 and older), and "Early Childhood" (ages 3 and older). Game software producers who subscribe to this service receive a rating from the ESRB and agree to include a corresponding rating symbol on the packaging for their software. The rating is also included in the game software. Game consoles can be selectively programmed by an authorized user not to play game software that has a rating for any age group above a desired level. Thus, a parent might set up a game console to only play game software that is rated to be suitable for Everyone. It is important that the game console prevent a user from circumventing any restriction regarding the play of software games beyond the category last set by an authorized user on the console.

There are several different approaches that can be used to enforce policies relative to the software that is executed on a computing device such as a game console. For example, a hardware component such as a resistor that has one of several different resistance values can be employed in the computing device to designate the region for which software is authorized. Software from a different region will then test for the resistance value and will not execute on the game console because the resistance value detected in the game console is not within a predefined tolerance of an expected value.

Other hardware-related techniques have been used for authenticating software plug-in cartridges used to store game software. In one prior art game system, the housing of authorized software game cartridges and a corresponding receptacle in the game console were formed to prevent cartridges of a different shape from being inserted into the receptacle. In addition, the game console and any authorized cartridge included a processor and a read only memory (ROM) that stored specific data needed to authenticate the cartridge. If the result of a calculation carried out by both the processor in the game console and the processor in the cartridge did not match, the game console would not enable the software for the game stored in the cartridge to execute on the game console.

Because of the richness of the graphics and the complexity of games designed to run on current generation game consoles, the game software is more efficiently distributed on either optical storage media, such as compact disc-read only memory discs (CDROMs) or digital versatile discs (DVDs). Accordingly, alternative approaches that do not rely upon hardware in the software component must be employed, since the discs do not provide the option of including other hardware components for use in authenticating the software and enforcing security and usage policies. Details of how each game console manufacturer has chosen to address this problem are not readily available. Clearly, it will be desirable to employ the data stored on the disc to determine if the software has been altered and to enforce security polices and usage of software executed on a game console.

A solution of this problem that is applicable to game software and game consoles may be equally applicable to many other types of computing devices in which control of software and data that is executed by the computing device is desired. For example, the security policies relating to use of satellite receivers, portable telephones, and other devices that may include a processor might also be enforced by the same approach employed on game consoles. Accordingly, a solution to this problem regarding securing game software for play on consoles in accord with a desired policy is also readily adapted for use in controlling how software and other digital data might be used on these other types of computing devices.

SUMMARY OF THE INVENTION

There are actually two broad steps that must be addressed in accord with the present invention, to ensure that digital data used by a computing device, such as a game console, is authorized, has not be altered since its release, and is used in conformance with any policies related to its use on such devices. In the first broad step, the digital data must be secured before it is distributed to an end user. Secondly, the computing device must be programmed to determine that the digital data are authorized, have not been altered, and otherwise conform to the secure policy regarding use of the digital data on that specific computing device.

To secure the digital data prior to its distribution, the method used in the present invention determines a data digest for the digital data in accord with a predefined procedure. Typically, the digital data includes a plurality of sections and in this step, a section digest is determined for each section using the predefined procedure, so that all of the sections digests comprise the data digest. This procedure produces the data digest in a form that is uniquely related to the digital data. The data digest is then included in a header for the digital data. Next, a header digest is determined for the header using the predefined procedure, and again, the header digest is uniquely related to the header. The header digest is then encrypted using a private key that is secret. The digital data has thus been secured for distribution.

Once secured, the encrypted header digest, the header, and the digital data can be distributed for use on a computing device. Prior to use of the digital data on the computing device, the computing device must confirm the authenticity of the digital data. The computing device confirms that the digital data are authorized and have not been altered since being secured by carrying out the following steps. Initially, the encrypted header digest is decrypted using a public key that corresponds to the private key, to recover the header digest. Next, a confirmation digest of the header is determined using the predefined procedure. The computing device then compares the confirmation header digest of the header to the header digest that was recovered by the step of decrypting, to confirm whether the header that was distributed with the digital data was altered since the digital data were secured. If not, the computing device determines a confirmation data digest of the digital data, corresponding to the data digest included in the header, using the predefined procedure. It then compares the confirmation data digest to the data digest included in the header, to confirm whether the digital data that were distributed have been altered after the step of securing. Actually, these last two steps determine a confirming section digest for each section of the digital data, and then compare the confirming section digest to the section digest included in the header. The computing device is programmed to prevent the computing device from further using the digital data if the confirmation header digest does not match the header digest that was recovered by the step of decrypting, or if the confirmation data digest does not match the data digest that was included in the header.

The preceding portion of the method has only addressed part of the problem. To control usage of the digital data, information specifying criteria for the secure policies that are to be enforced is included in the header of the digital data before the digital data are secured. The predefined procedure is thus applied to the header that includes this information, to determine the header digest, as noted above. Prior to enabling use of the digital data on the computing device (assuming that the confirmation header digest has matched the header digest that was recovered by the step of decrypting), the computing device is programmed to determine if the information in the header enables or permits use of the digital data on the computing device. If so, further use of the digital data on the computing device is permitted, unless otherwise prevented because the authenticity of the digital data is not confirmed. If not, any further use of the digital data on the computing machine is prevented.

In determining if the information in the header enables use of the digital data on the computing device, the computing device compares an indication of a secure policy criterion included in the information within the header with a state of a corresponding criterion stored on the computing device, to confirm that they match. For at least one criterion, an authorized user is enabled to select the state of the criterion on the computing machine. Other types of criteria are stored in a memory on the computing device and are not accessible or alterable by a user of the computing device. The information in the header preferably indicates a number of system policy criteria, including a geographical region in which the digital data are permitted to be used on the computing device, a type of media from which the digital data are permitted to be loaded into the computing device for use, a rating that is based upon at least one characteristic of the digital data, console system settings that must be in place prior to execution or use of the digital data (e.g., such as a user interface language, a date, a time, etc.), a fault tolerance indication of whether the digital data can be trusted when certain system components are determined to be at fault, an ejection control indicating whether the digital data can be trusted to permit removal of the portable medium upon which the digital data resides, and/or any other predetermined system policies.

The predefined procedure used to produce each digest preferably comprises a hashing algorithm. As noted above, each section of the digital data is processed by the predefined procedure to produce a section digest that is included in the header. The computing device is programmed to preclude further use of the digital data in any section for which the confirming section digest does not match its corresponding section digest in the header.

Other aspects of the present invention are directed to a system for carrying out the steps of the method used in securing the digital data and in enforcing the secure policy on the digital data prior to its use on the system. In each case, the system includes a processor and a memory in which machine instructions are stored that cause the processor to carry out functions generally consistent with the steps of the method described above. Also, the present invention is directed to memory media on which are stored machine instructions for carrying out the steps discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention is described below in regard to its use in an electronic gaming system that is designed to execute gaming software distributed on a portable, removable medium. Those skilled in the art will recognize that the present invention may also be implemented in a set-top box, in an arcade game, in a handheld device, in a personal computer (PC), and in other systems in which there is a need to enforce security policies when utilizing digital data.

Exemplary System

Figure 1:
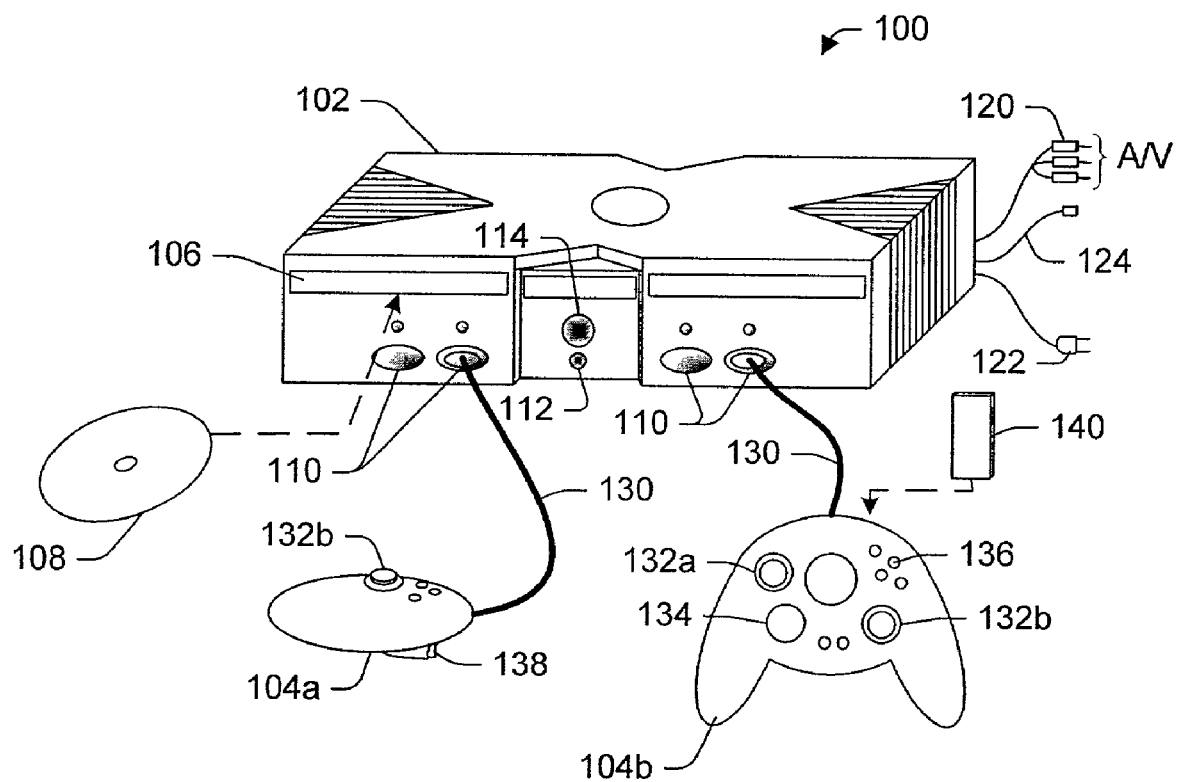
FIG. 1 is a schematic isometric view of a gaming system, which is suitable for use in implementing the present invention.

As shown in FIG. 1, an exemplary electronic gaming system 100 includes a game console 102 and support for up to four user input devices, such as controllers 104a and 104b. Game console 102 is equipped with an internal hard disk drive (not shown in this Figure) and a portable media drive 106 that supports various forms of portable optical storage media, as represented by an optical storage disc 108. Examples of suitable portable storage media, include DVD discs and CD-ROM discs. In this gaming system, game programs are preferably distributed for use with the game console on DVD discs, but it is also contemplated that other storage media might instead be used on this or other types of systems that use the present invention to enforce data security policies and to ensure the authenticity of the digital data that are input to the system.

On a front face of game console 102 are four slots 110 for connection to and support of the controllers, although the number and arrangement of slots may be modified. A power button 112 and an eject button 114 are also positioned on the front face of game console 102. Power button 112 controls application of electrical power to the game console, and eject button 114 alternately opens and closes a tray (not shown) of portable media drive 106 to enable insertion and extraction of storage disc 108 so that the digital data on it can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data over a network such as the Internet, for example, via a conventional telephone modem or broadband connection.

Each controller 104a and 104b is coupled to game console 102 via a lead (or alternatively through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 1, each controller 104a and 104b is equipped with two thumbsticks 132a and 132b, a D-pad 134, buttons 136, and two triggers 138. These controllers are merely representative, and other known gaming input and control mechanisms may be substituted for or added to those shown in FIG. 1 for use with game console 102.

A removable or portable memory unit (MU) 140 can optionally be inserted into controller 104 to provide additional removable storage. Portable MUs enable users to store game parameters and port them for play on other consoles, by inserting the portable MUs into the other controllers. In the described implementation, each controller is configured to accommodate two MUs, although more or fewer than two MUs may instead be employed.

Gaming system 100 is capable of playing, for example, games, music, and videos. It is contemplated that other functions can be implemented using digital data stored on the hard disk drive or read from optical storage disc 108 in drive 106, from an online source, or from MU 140. For example, gaming system 100 is potentially capable of playing:

Game titles stored on CD and DVD discs, on the hard disk drive, or downloaded from an online source;

Digital music stored on a CD in portable media drive 106, in a file on the hard disk drive (e.g., Windows Media Audio™ (WMA) format), or derived from online streaming sources on the Internet or other network; and Digital audio visual (AV) data stored on a DVD disc in portable media drive 106, or in a file on the hard disk drive (e.g., in an Active Streaming Format), or from online streaming sources on the Internet or other network.

Figure 2:
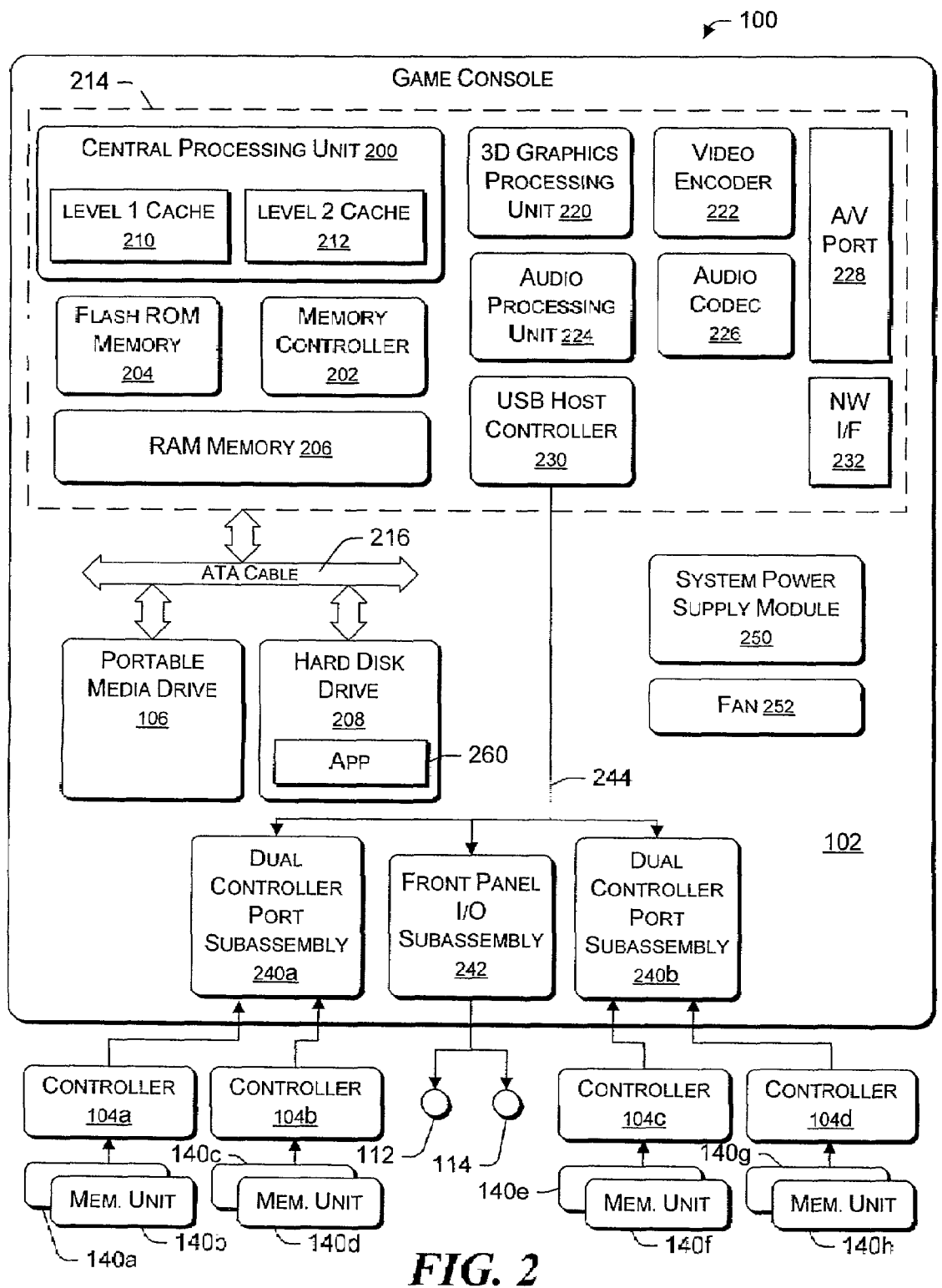
FIG. 2 is a block diagram of the gaming system of FIG. 1.

FIG. 2 shows functional components of gaming system 100 in greater detail. Game console 102 includes a central processing unit (CPU) 200, and a memory controller 202 that facilitates processor access to various types of memory, including a read-only memory (ROM) 204, a random access memory (RAM) 206, a hard disk drive 208, and portable media drive 106. CPU 200 is equipped with a level 1 cache 210 and a level 2 cache 212 to temporarily store data so as to reduce the number of memory access cycles, thereby improving processing speed and throughput. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

As an example of one suitable implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAMs (DDR SDRAMs) that are independently controlled by memory controller 202 via separate buses (not shown). Hard disk drive 208 and portable media drive 106 are connected to the memory controller via the PCI bus and an Advanced Technology Attachment (ATA) bus 216.

A 3D graphics processing unit 220 and a video encoder 222 form a video processing pipeline for high-speed and high-resolution graphics processing. Data are carried from graphics processing unit 220 to video encoder 222 via a digital video bus (not shown). An audio processing unit 224 and an audio encoder/decoder (codec) 226 form a corresponding audio processing pipeline for high fidelity and stereo audio data processing. Audio data are carried between audio processing unit 224 and audio codec 226 via a communication link (not shown). The video and audio processing pipelines output data to an A/V port 228 for transmission to the television or other display monitor. In the illustrated implementation, video and audio processing components 220-228 are mounted on module 214.

Also implemented by module 214 are a USB host controller 230 and a network interface 232. USB host controller 230 is coupled to CPU 200 and memory controller 202 via a bus (e.g., the PCI bus), and serves as a host for peripheral controllers 104a-104d. Network interface 232 provides access to a network (e.g., the Internet, home network, etc.) and may be any of a wide variety of various wire or wireless interface components, including an Ethernet card, a modem, a Bluetooth module, a cable modem, and the like.

Game console 102 has two dual controller support subassemblies 240a and 240b, with each subassembly supporting two game controllers 104a-104d. A front panel input/output (I/O) subassembly 242 supports the functionality of power button 112 and eject button 114, as well as any light-emitting diodes (LEDs) or other indicators exposed on the outer surface of the game console. Subassemblies 240a, 240b, and 242 are coupled to module 214 via one or more cable assemblies 244.

Eight MUs 140a-140h are illustrated as being connectable to four controllers 104a-104d, i.e., two MUs for each controller. Each MU 140 offers additional storage on which games, game parameters, and other data may be stored. When inserted into a controller, MU 140 can be accessed by memory controller 202.

A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210, 212 for execution by CPU 200. Various portions of software application 260 may be loaded only when needed, or all of the software application (depending on its size) may be loaded into RAM 206. Software application 260 is described below in greater detail.

Gaming system 100 may be operated as a standalone system by simply connecting the system to a television or other display monitor. In this standalone mode, gaming system 100 enables one or more users to play games, watch movies, or listen to music. However, with conventional modem or broadband connectivity to the Internet or other network, which is made available through network interface 232, gaming system 100 may be further operated as a component of a larger network gaming community, to enable online multiplayer interaction in games over the Internet or other network.

Network System

Figure 3:
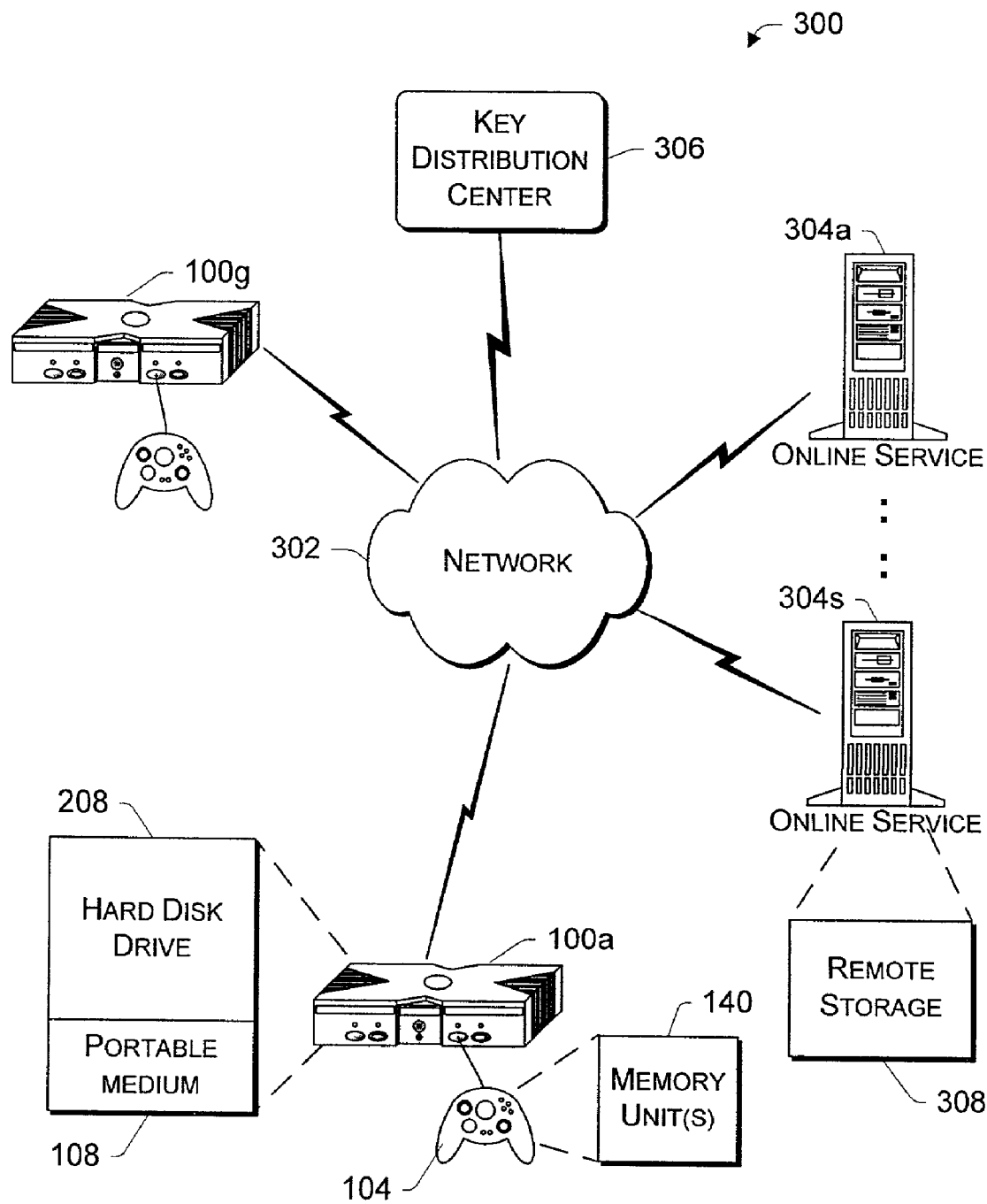
FIG. 3 is a schematic diagram illustrating a network gaming system in which the gaming system of FIG. 1 is connected via a network to other consoles and services.

FIG. 3 shows an exemplary network gaming environment 300 that interconnects multiple gaming systems 100a, . . . 100n via a network 302. Network 302 represents any of a wide variety of data communications networks and may include public portions (e.g., the Internet), as well as private portions (e.g., a residential Local Area Network (LAN)). Network 302 may be implemented using any one or more of a wide variety of conventional communications configurations including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304a, . . . 304m may be accessible via network 302 to provide various services for the participants, such as hosting online games, serving downloadable music or video files, hosting gaming competitions, serving streaming A/V files, and the like. Network gaming environment 300 may further employ a key distribution center 306 that plays a role in authenticating individual players and/or gaming systems 100 for interconnection to one another as well as to online services 304. Distribution center 306 distributes keys and service tickets to valid participants that may then be used to form game playing groups including multiple players, or to purchase services from online services 304.

Network gaming environment 300 introduces another memory source available to individual gaming systems 100, i.e., online storage. In addition to optical storage disc 108, hard disk drive 208, and MU(s) 140, gaming system 100a can also access data files available at remote storage locations via network 302, as exemplified by remote storage 308 at online service 304m.

Exemplary Method

For exemplary purposes, the following describes a preferred embodiment for securing a game and securely using that game only on an authorized console to ensure that the game software has not been altered and to ensure that only software authorized to be played on a game console can be played. Specifically, this embodiment enforces security and other policies in regard to a game distributed on a portable media, such as an optical disc, and ensures that only unaltered copies of the game can be executed and only by a specific set of authorized game consoles, such as game consoles sold for use only in a specific region of the world. Those skilled in the art will recognize that the present invention can be applied to other forms of digital data, such as simulations, images, video, audio, text, etc., and that the methods described below can also be applied to, or easily modified for use in controlling access to digital data over almost any type of network, distributed on almost any type of media or via almost any type of propagation medium, including, for example, radio frequency transmissions and optical signals, without limitation.

Figure 4:
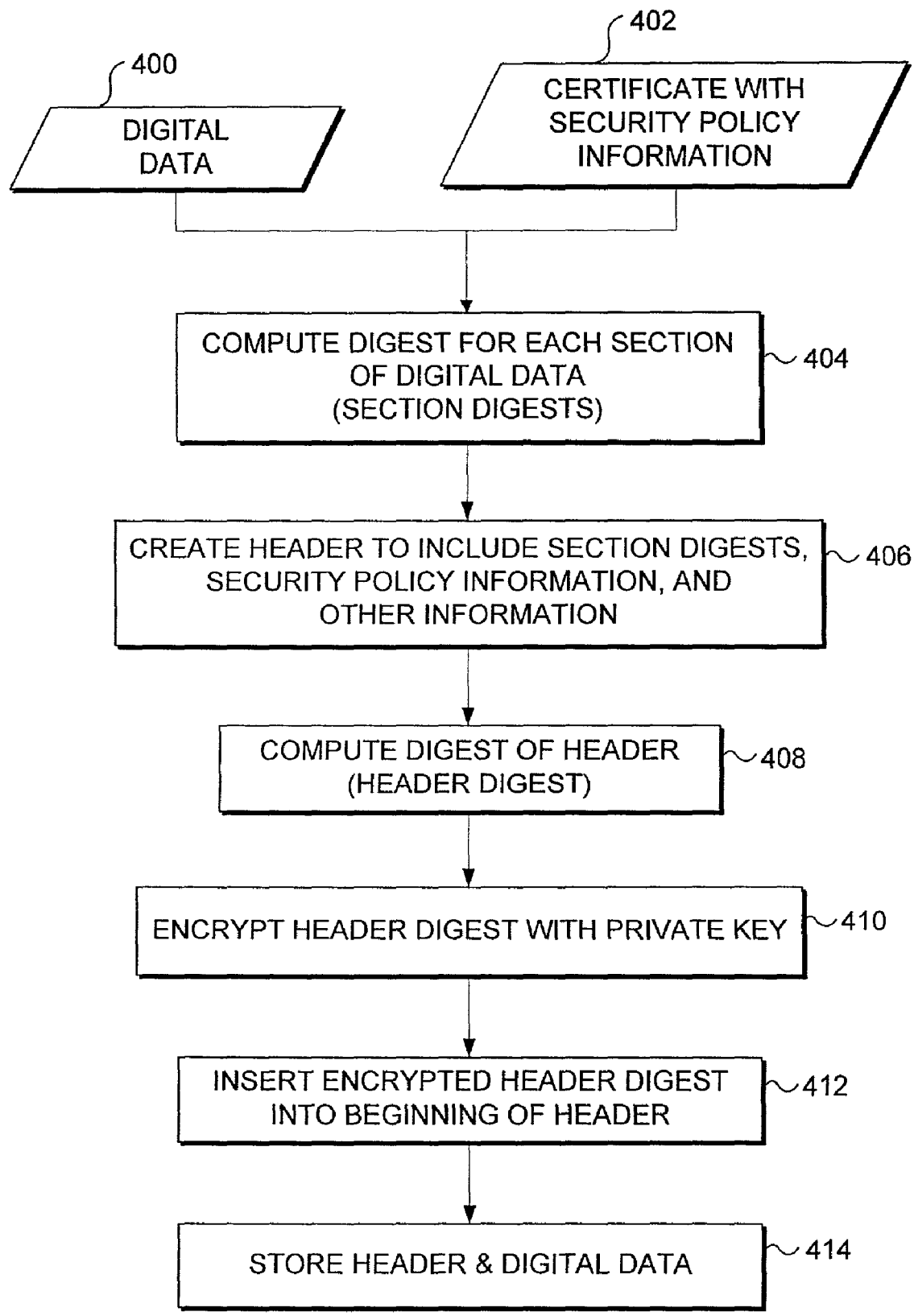
FIG. 4 is a flow diagram illustrating logic used to secure digital data onto a portable media for use only on an authorized console.

FIG. 4 is a flow diagram illustrating logic used to secure the game software as digital data 400 stored on the portable media for use only on an authorized console. Along with digital data 400, a certificate 402 is encoded onto the portable media. Certificate 402 includes desired security policy information, such as a content rating as defined by the ESRB. Other security policy information includes a game region in which the game software is authorized to be used, such as North America, Japan, Europe, or the "Rest of the World." The game region information may indicate a functional aspect rather than a geographic region. For example, a "manufacturing region" may be used during production and post-production service of a game console, which enables digital data to be used only on special versions of the console provided to manufacturers and maintenance service providers. Another form of security policy information optionally included in the Certificate specifies a type of media that the game console is authorized to access when loading the digital data into RAM. For example, the Certificate may be set to a unique optical storage disc type that can only be read by certain kinds of game consoles. Using the type of media, a software distributor may preclude the software from being loaded into RAM from the hard drive or over the network, or conversely, may be set to authorize downloading over the network, e.g., to permit demo software to play on the console. Alternatively, or in addition, the media type may be set to include a specific authorized web site from which the digital data can be accessed and loaded into RAM, precluding the software from being downloaded from any other site.

To secure the digital data on the portable media, a securing system identifies sections of the digital data and computes a digest for each section of the digital data, at a step 404. Each digest is referred to as a section digest. Preferably, the section digests are computed with an algorithm such as version 1 of the Secure Hash Algorithm (SHA-1) as defined by the National Institute of Standards and Technology (NIST). Further information regarding SHA-1 is available at http://www.itl.nist.gov/fipspubs/fip180-1.htm.

At a step 406, the securing system creates a header that includes each of the section digests, the security policy information, and any other information that may be desired for inclusion in the header data of the digital data. The securing system then computes a digest of the entire header, at a step 408, producing a header digest. At a step 410, the securing system encrypts the header digest with a private key. As is well known in the art, a private key is part of a digital signature algorithm for securing and authenticating digital data, so that a corresponding public key can be used to confirm the authenticity of the data and decrypt the data. Additional information regarding digital signature algorithms may be found at http://csrc.nist.gov/publications/fips/fips186-2/fips186-2.pdf, as evidence that the use of private and public keys in connection with secure transmission of data are well known. Once the header digest is encrypted, the securing system inserts the encrypted header digest into the beginning of the header, at a step 412. At a step 414, the securing system then stores the header and digital data on the portable media or other storage device for distribution. For example, the header and digital data can be stored on DVDs for distribution to end users having an appropriate game console.

Figure 5:
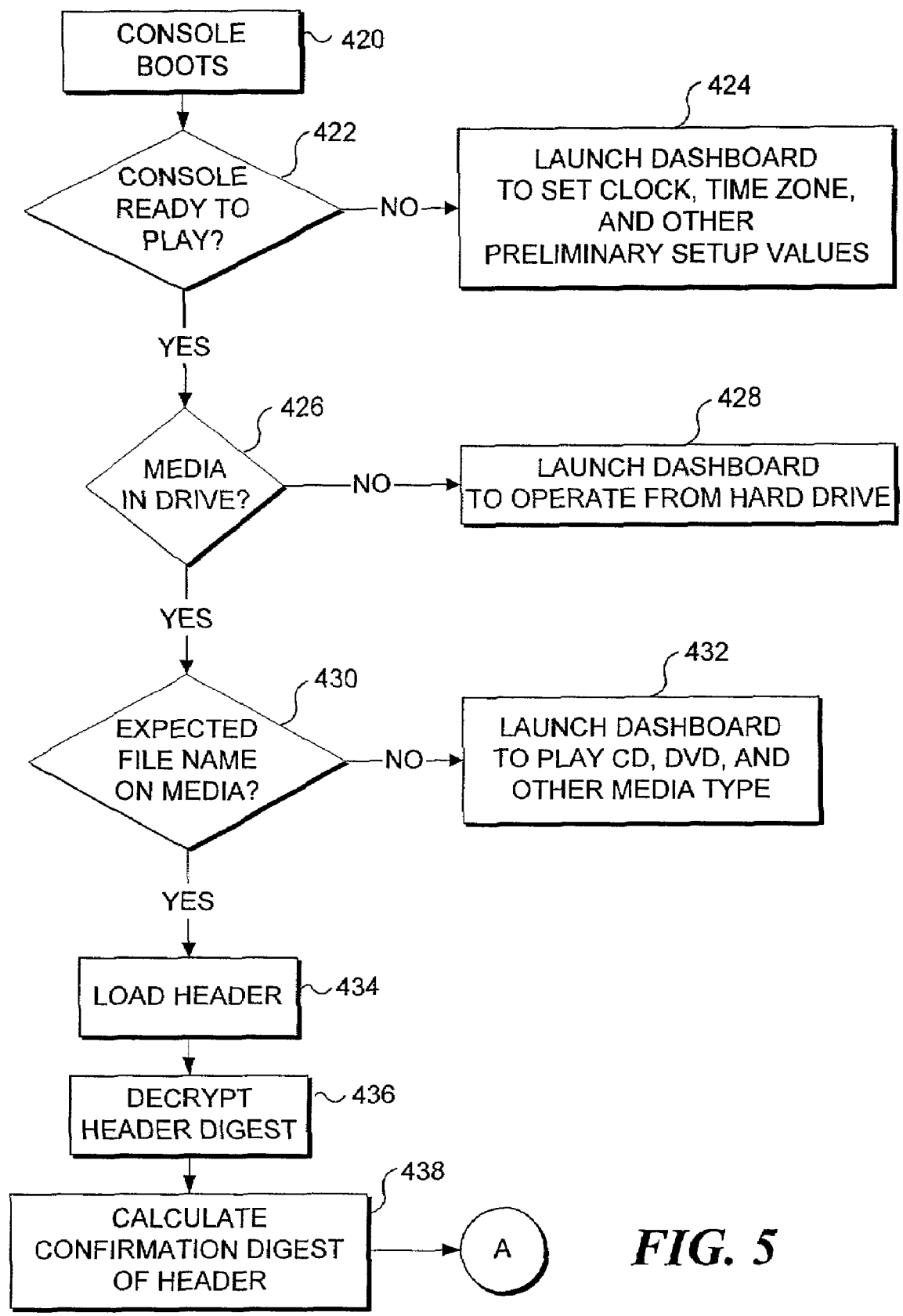
FIG. 5 is a flow diagram illustrating logic used to initialize a console for enforcing security policies associated with the console and the digital data.

To authenticate the digital data and to insure that the digital data were not altered after being secured as described above, the console performs verification steps as described below, with regard to FIGS. 5-7. FIG. 5 is a flow diagram illustrating logic used to initialize the console for enforcing the security policies associated with the console and the digital data. At a step 420, the console is powered on (or reset), causing it to "boot up." At a decision step 422, the console determines whether preliminary values and parameters have been set. For example, the console determines whether it has been configured for a time zone, clock setting, and other preliminary values that are typically input when the game console is initially set up for use. If any of these values or parameters for the console has not yet configured, the console launches a user interface, referred to as a "dashboard," at a step 424, to enable a user to configure the console with the one or more parameters or values that have not yet been entered.

When the console is configured, the console determines, at a decision step 426, whether a portable media is in the console's media drive. Those skilled in the art will recognize that the console may additionally, or alternatively, determine whether digital data are currently accessible for download, available from streaming server, or for other access. If the portable media is not in the console's media drive, the console launches the dashboard, at a step 428, using machine instructions to and data stored on the hard drive. If the portable media is detected in the media drive, or other access to the data is provided, the console determines, at a decision step 430, whether the portable media includes a file with a predetermined name. The console expects to find a file with a predetermined name, which identifies the type of media in the media drive or provided from another source. The media drive may be capable of reading multiple media types, such as audio CDs, DVDs, game discs, and other media types. If the predetermined file name identifies the portable media as a game disc that includes the necessary header and other digital data, the following steps are implemented. If the portable media does not include the expected predefined file name indicating the type of media, the console launches the dashboard, at a step 432, so that the console may be used to play a CD, DVD, or other media type.

When a game disc is detected, the console loads the header from the game disc, at a step 434. At a step 436, the console decrypts the header digest with a public key that is associated with the private key used to encrypt the header digest. Preferably, the public key is stored in permanent storage in the console, i.e., in ROM 204. At a step 438, the console then calculates a confirmation digest of the header for comparison with the decrypted header digest. Control then passes to a decision step 440 of FIG. 6 via a connector A.

Figure 6:
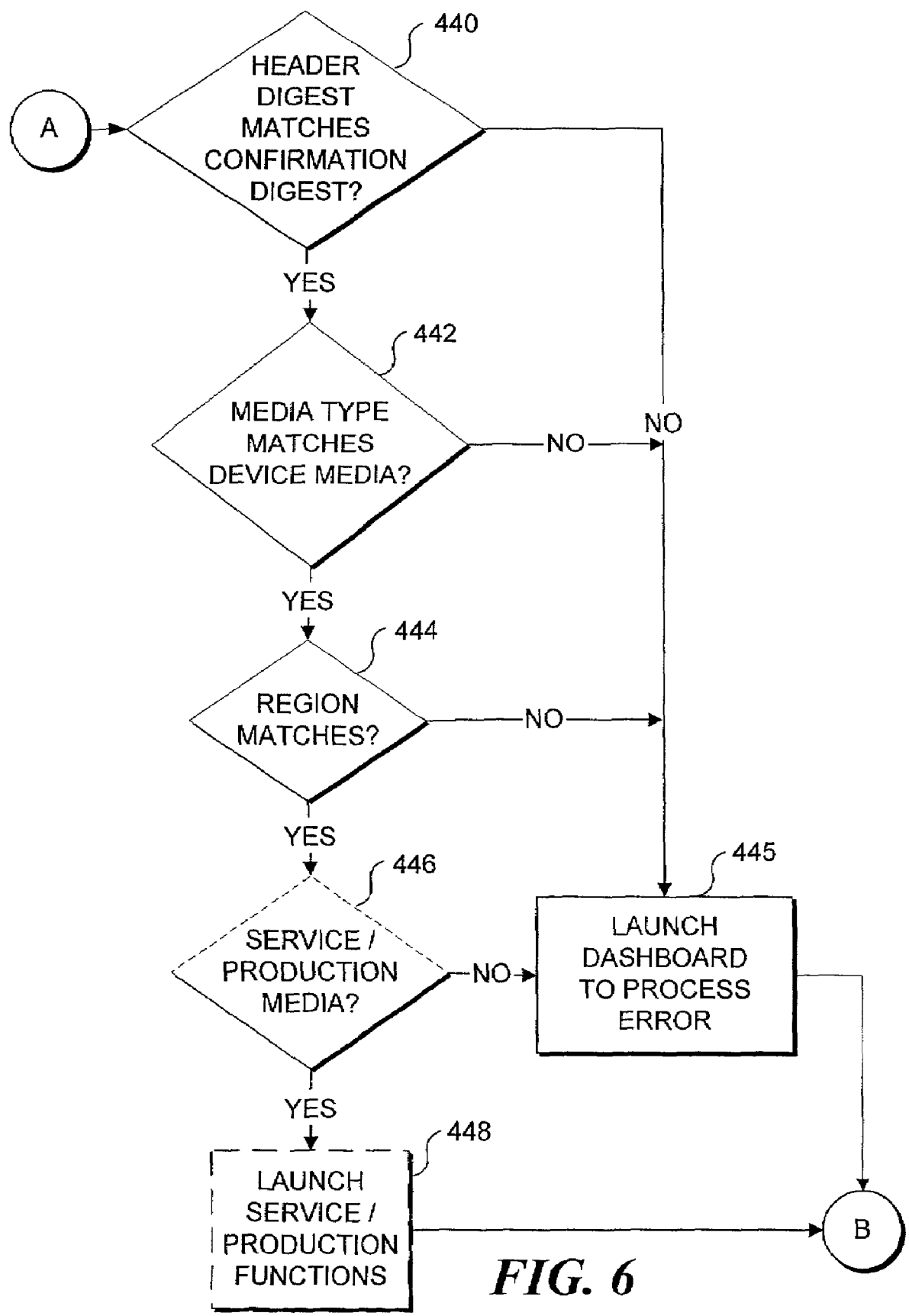
FIG. 6 is a flow diagram illustrating logic used to enforce compatibility security policies between the console and the digital data.

With reference to FIG. 6, a decision step 440 indicates that the console determines whether the decrypted header digest matches the confirmation digest. If the two digests do not match, the console launches the dashboard to process an error, at a step 445. The console would indicate that an error in authenticating the software data has occurred.

If the two digests match, the console reads the header for security policy information and determines, at a decision step 442, whether the media type written in the header matches the media type detected at decision step 430 of FIG. 5. At decision step 430, the console may have detected the expected predefined file name which would give initial indication that a valid game software disc is in the portable media drive. However, the expected predefined file name may simply have been written onto a writable compact disc. Thus, at decision step 442 of FIG. 6, the console determines whether the header also indicates if the digital data is authorized to be stored on a read-only game disc, and not stored on a writable compact disc, a cartridge, a memory card, a remote storage device, or other storage media type. If the media type listed in the header does not match the media type detected, the console launches the dashboard to process an error, at step 445.

If the authorized media type matches the portable media type that was detected, the console performs a similar validation of the game region. Specifically, at a decision step 444, the console determines whether the game region identified in the header matches the game region stored in a permanent storage of the console, i.e., in ROM 204. For example, the console confirms that a North American game disc is being used in a game console sold for use only in North America. If the game region identified in the header does not match the game region stored in the console, the console launches the dashboard to process an error, at step 445.

If the game region matches, the console may perform other similar optional validations. For example, at a decision step 446, the console may determine whether the digital data on the portable media is intended for manufacturing or software development purposes, or for post-production servicing, or other non-game functions. Alternatively, or in addition, the console may determine whether the digital data to be loaded requires that the system ensure that various system settings are in place prior to execution of the digital data. Such system settings may include a user interface language, a date, a time of day, and/or other settings. The console may also determine whether the digital data can be trusted to run when certain system components are determined to be at fault. For example, the console may check whether a bit is set that unlocks the hard disk. Yet another validation may be for whether the digital data can be trusted to safely permit removal of the portable media by the user, or whether such removal should be effected by the system itself.

If the console determines that the header does not identify a valid and authorized function for the digital data, or otherwise fails one of the validity checks, the console launches the dashboard to process an error, at step 445. However, if the console does determine a valid function is being carried out, the console launches the manufacturing function, service function, or other valid function that was detected, at a step 448. Control then passes to a step 450 of FIG. 7 via a connector B.

Figure 7:
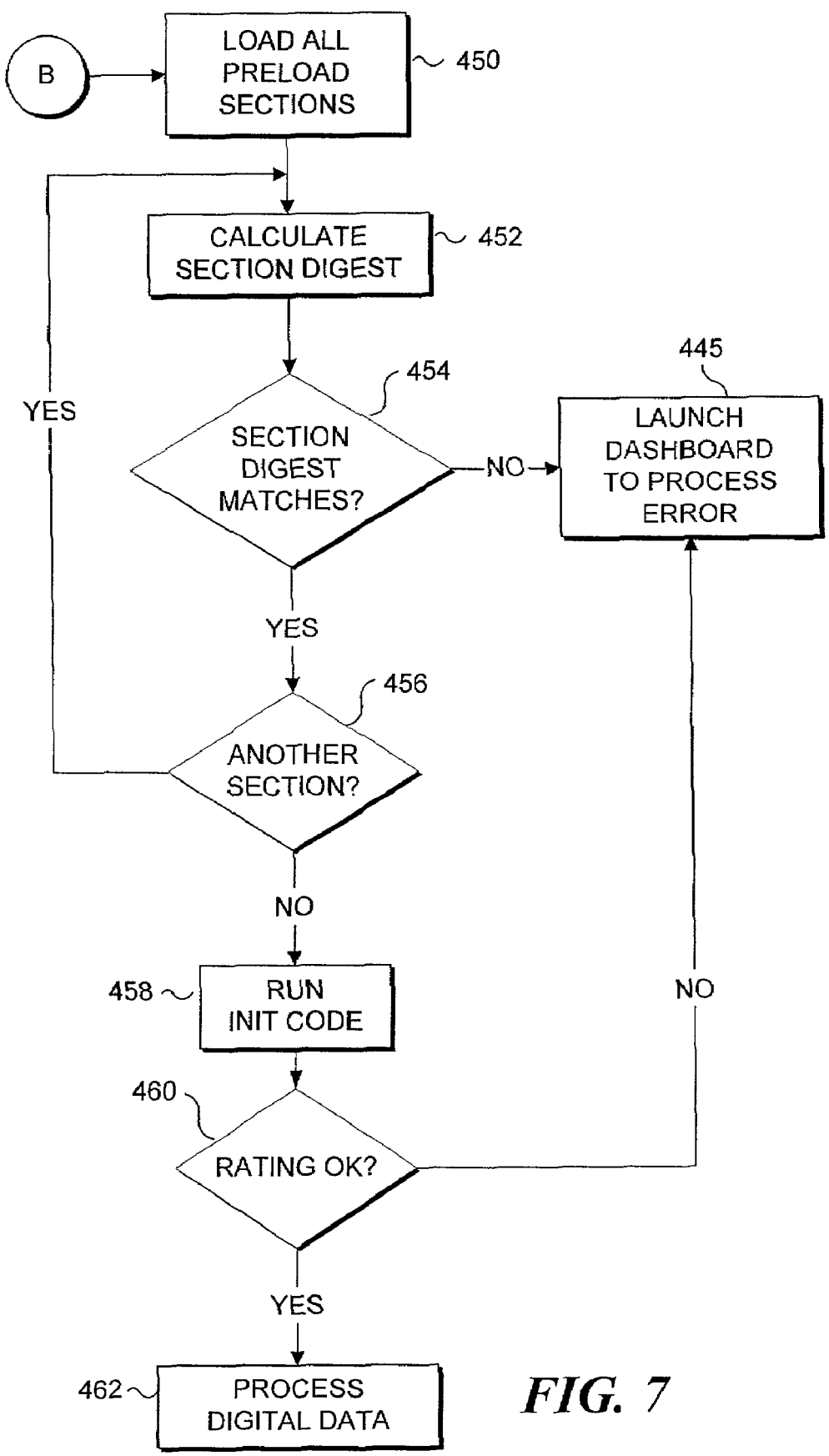
FIG. 7 is a flow diagram illustrating logic used to enforce security policies for utilizing the digital data with the console.

In the logic of FIG. 7, security policies for utilizing the digital data with the console are enforced. By this point in time, the console has determined that the header data is valid and tested the information included in the Certificate. However, to insure that each section of the digital data itself has not been altered, the console must verify the digest of each section. To do so efficiently, the console loads all preload sections at step 450. The preload sections, include the portion of the game program code that must be executed to initialize the game. At a step 452, the console calculates a section digest for the first section of digital data. At a decision step 454, the console compares the calculated section digest with the section digest for that section that is stored in the header. If the calculated section digest does not match the digest stored in the header for that section, the console launches the dashboard to process an error, at step 445. If the section digests match, the console determines, at a decision step 456, whether another section of digital data is preloaded. If another section of digital data is preloaded, control returns to step 452 to calculate a section digest for that next section of the digital data. The comparison is performed for each section of the digital data. The same procedure is carried out for all other sections of the digital data before they are allowed to execute on the game console.

Once all sections have been validated, the console reads and runs some initialization code from the portable media, at a step 458. The initialization code is preferably stored onto the portable media by the securing system and is used to process other security policy information. For example, the console may use the initialization code to determine, at a decision step 460, whether the digital data matches the ESRB rating that the console was configured to accept by an authorized user (such as a parent of a child who is using the game console). If the ESRB rating of the digital data does not match the ESRB rating configured in the console (i.e., stored in ROM 204), the console launches the dashboard to process an error, at step 445. Those skilled in the art will recognize that the initialization code may be alternatively incorporated into the ROM, rather than the portable media. Thus, all validations could be accomplished as described above with regard to FIG. 6. Conversely, some, or all, of the policies validated via the ROM, may alternatively be validated by the initialization code of the portable media.

In any case, once the ESRB rating, and/or other security policies are validated, the console processes the remainder of the digital data at a step 462 to execute the game or perform other operations that these digital data instruct the console to perform. Thus, the game console can detect altered software and will not allow any altered software to execute on the console. Also, if the other parameters included in the Certificate information of the software header do not match the settings on the game console, the digital data will not be executed on the game console. Accordingly, the present invention ensures that only authorized game software will be executed on the game console, since game software that is not secured by encrypting the header digest using the private key will not be executed. Changes in the software or other digital data stored on the media will be detected, since the decrypted header digest will not match the header digest determined by the game console. Also, all other security and use policies will be enforced based upon a comparison of the parameters stored in ROM on the console with those in the Certificate in the game software header. Since the header includes the Certificate information, any change to the Certificate information will also be readily detected, precluding execution of the digital data on the game console.

Exemplary Operating Environment for Securing Digital Data

Figure 8:
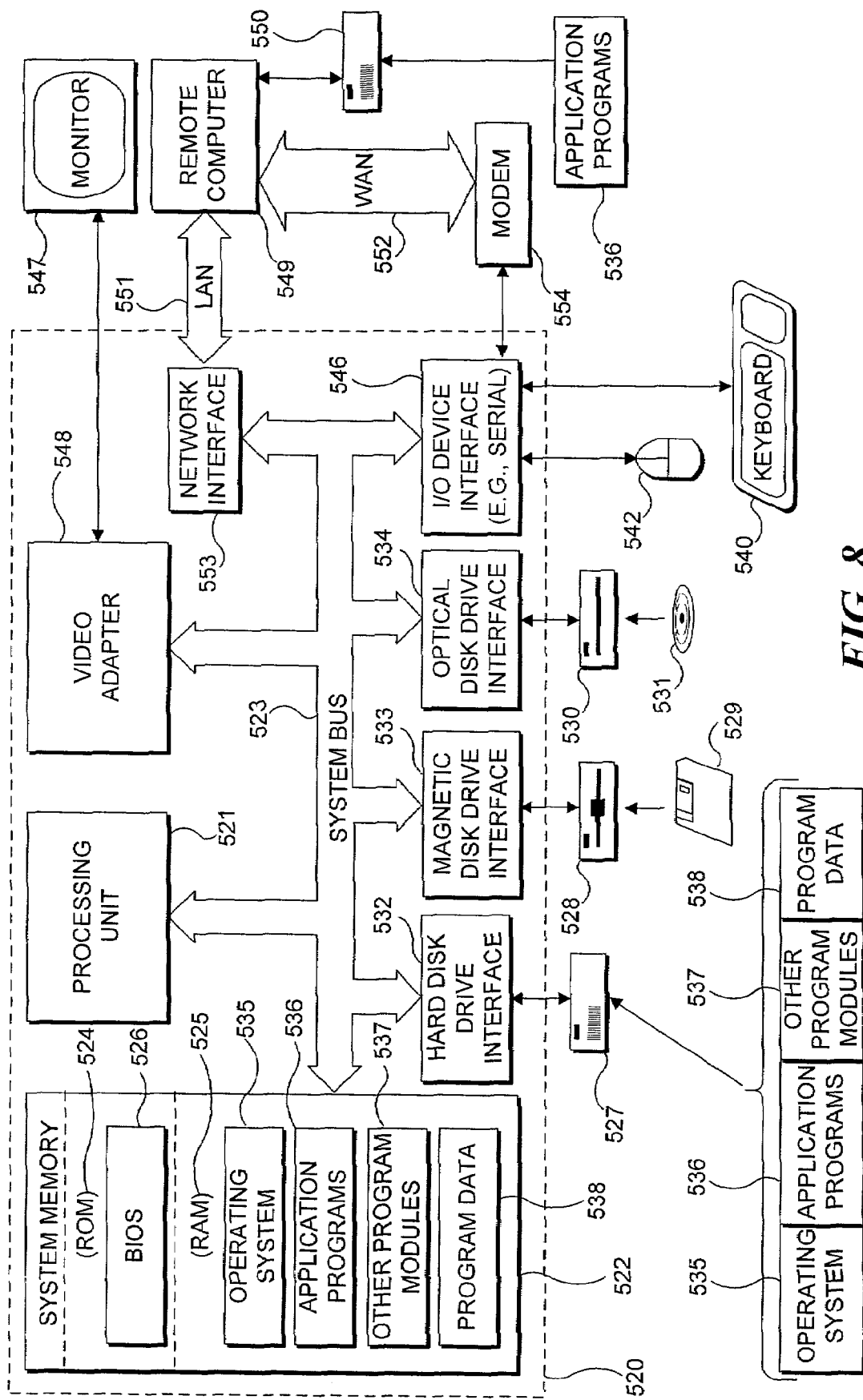
FIG. 8 is a block diagram of a generally conventional personal computer (PC), that is suitable for securing the digital data prior to distributing the digital data for use on the console.

FIG. 8 and the following discussion are intended to provide a brief, general description of a suitable computing environment in which the present invention may be implemented to secure digital data for subsequent distribution and use on a number of different consoles. This aspect of the present invention can be practiced on a single computing device, but will often be implemented on a client computing device and/or a server or other remote computing device connected by a communication network, both of which will typically include the functional components shown in FIG. 8. Although not required, this aspect of the present invention will be described in the general context of computer executable instructions, such as program modules that are executed by a PC. Generally, program modules include application programs, routines, objects, components, functions, data structures, etc. that perform particular tasks or implement particular abstract data types. Also, those skilled in the art will appreciate that this invention might also be practiced with other computer system configurations, such as a client device for executing personal productivity tools, other microprocessor-based or programmable consumer electronic devices, multiprocessor systems, network PCs, minicomputers, mainframe computers, and the like. Furthermore, the present invention can also be practiced in distributed computing environments, where tasks are performed by remote processing devices that are linked through a communications network. In a distributed computing environment, program modules may be located in both local and remote memory storage devices.

With reference to FIG. 8, an exemplary system for securing the digital data in accord with the present invention includes a general purpose computing device in the form of a conventional PC 520, provided with a processing unit 521, a system memory 522, and a system bus 523. The system bus couples various system components including the system memory to processing unit 521 and may be any of several types of bus structures, including a memory bus or memory controller, a peripheral bus, and a local bus using any of a variety of bus architectures. The system memory includes read only memory (ROM) 524 and random access memory (RAM) 525. A basic input/output system 526 (BIOS), containing the basic routines that help to transfer information between elements within the PC 520, such as during start up, is stored in ROM 524. The PC 520 further includes a hard disk drive 527 for reading from and writing to a hard disk (not shown), a magnetic disk drive 528 for reading from or writing to a removable magnetic disk 529, and an optical disc drive 530 for reading from or writing to a removable optical disc 531, such as a CD-ROM or other optical media. Hard disk drive 527, magnetic disk drive 528, and optical disc drive 530 are connected to system bus 523 by a hard disk drive interface 532, a magnetic disk drive interface 533, and an optical disc drive interface 534, respectively. The drives and their associated computer readable media provide nonvolatile storage of computer readable machine instructions, data structures, program modules, and other data for PC 520. Although the exemplary environment described herein employs a hard disk, removable magnetic disk 529, and removable optical disc 531, it will be appreciated by those skilled in the art that other types of computer readable media, which can store data and machine instructions that are accessible by a computer, such as magnetic cassettes, flash memory cards, digital video discs (DVDs), Bernoulli cartridges, RAMs, ROMs, and the like, may also be used in the exemplary operating environment.

A number of program modules may be stored on the hard disk, magnetic disk 529, optical disc 531, ROM 524, or RAM 525, including an operating system 535, one or more application programs 536, other program modules 537, and program data 538. A user may enter commands and information into PC 520, and provide control input through input devices such as a keyboard 540 and a pointing device 542. Pointing device 542 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 521 through an I/O interface 546 that is coupled to the system bus 523. The term I/O interface is intended to encompass each interface specifically used for a serial port, a parallel port, a game port, a keyboard port, and/or a universal serial bus (USB). A monitor 547 or other type of display device is also connected to system bus 523 via an appropriate interface, such as a video adapter 548, and is usable to display application programs, graphic images, Web pages, and/or other information. In addition to the monitor, PCs are often coupled to other peripheral output devices (not shown), such as speakers (through a sound card or other audio interface—not shown) and printers.

As indicated above, the invention may be practiced on a single machine, however, PC 520 can also operate in a networked environment using logical connections to one or more remote computers, such as a remote computer 549. Remote computer 549 may be another PC, a server (which is typically generally configured much like PC 520), a router, a network PC, a peer device, or a satellite or other common network node, and typically includes many or all of the elements described above in connection with PC 520, although only an external memory storage device 550 has been illustrated in FIG. 8. The logical connections depicted in FIG. 8 include a local area network (LAN) 551 and a wide area network (WAN) 552. Such networking environments are common in offices, enterprise wide computer networks, intranets, and the Internet.

When used in a LAN networking environment, PC 520 is connected to LAN 551 through a network interface or adapter 553. When used in a WAN networking environment, PC 520 typically includes a modem 554, or other means such as a cable modem, Digital Subscriber Line (DSL) interface, or an Integrated Service Digital Network (ISDN) interface for establishing communications over WAN 552, such as the Internet. Modem 554, which may be internal or external, is connected to the system bus 523 or coupled to the bus via I/O device interface 546; i.e., through a serial port. In a networked environment, program modules depicted relative to PC 520, or portions thereof, may be stored in the remote memory storage device. It will be appreciated that the network connections shown are exemplary and other means of establishing a communications link between the computers may be used, such as wireless communication and wide band network links.

PC 520 might have secure access to the private key that is employed to encrypt the header digest for a game using a conventional private/public key encryption scheme. Alternatively, once the header digest has been calculated on PC 520, the digital data, header, and header digest can be removed to a secure site where the header digest will be encrypted with the private key. Thereafter, the digital data, header, and encrypted header digest will be stored on a master for replication onto other appropriate media, such as DVDs or CD-ROMs, prior to distribution, or will be distributed over a network (such as the Internet) to consoles or other types of computing devices, which have been described above.

Although the present invention has been described in connection with the preferred form of practicing it and modifications thereto, those of ordinary skill in the art will understand that many other modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of securing digital data that are to be distributed for use on a computing device, comprising the steps of:
   processing, by the securing system, the digital data to create a data digest that uniquely corresponds to the digital data, wherein the digital data comprise a plurality of sections;
   including, by the securing system, the data digest in a header of the digital data, the including comprising including the plurality of section digests in the header;
   including security policy information in the header of the digital data, wherein the security policy information controls use of the digital data on the computing device and comprises one or more of:
      an indication of a geographic region in which the digital data are authorized to be used;
      an indication of a type of media from which the digital data are authorized to be loaded into the computing device for use, wherein the type of media is an optical storage disc;
      a console system setting that must be in place prior to use of the digital data;
      a fault tolerance indication of whether the digital data can be trusted when certain system components are determined to be at fault; and
      an ejection control indication of whether the digital data can be trusted to permit removal of a portable medium upon which the digital data is stored;
   processing the header that includes the data digest to create a header digest that uniquely corresponds to the header, the processing comprising processing each of the plurality of sections to produce a plurality of section digests uniquely corresponding to the plurality of sections of the digital data;
   encrypting the header digest with a private key, said private key having a corresponding public key that is provided when the digital data are to be used on the computing device; and storing the digital data, the header of the digital data and the encrypted header digest for distribution to an end user, for use on the computing device.

2. The method of claim 1, wherein the steps of creating the data digest and the header digest each comprise the step of employing a hashing algorithm to produce the data digest and the header digest, respectively.

3. The method of claim 1, wherein the one or more optical storage medium are usable by the computing device to run the digital data.

4. The method of claim 1, wherein the step of distributing comprises at least one of the steps of:
storing the digital data with the encrypted header on a storage media usable by the computing device; and
transmitting the digital data with the encrypted header over at least one of a wire and a wireless communication network, for use by the computing device.

5. The method of claim 1, wherein the digital data comprise game software; and wherein the computing device runs the game software to enable a game to be played by an end user.

6. A method for enabling use of digital data on a computing device, so as to ensure that the digital data have not been altered and so as to enforce policies regarding use of the digital data, said digital data being distributed along with a header and with an encrypted header digest for the digital data that was produced by encrypting the header digest with a private key, comprising the steps of:
receiving, at the computing device, the digital data and the header of the digital data, the digital data comprising a plurality of sections, the header comprising:
the encrypted header digest of the digital data,
a plurality of session digests each uniquely corresponding to one of the plurality of sessions of the digital data that was produced prior to distribution of the digital data; and
security policy information for controlling use of the digital data at the computing device, wherein the security policy information comprises at least one of:
an indication of a geographic region in which the digital data are authorized to be used;
an indication of a type of media from which the digital data are authorized to be loaded into the computing device for use, wherein the type of media is an optical storage disc;
a console system setting that must be in place prior to use of the digital data;
a fault tolerance indication of whether the digital data can be trusted when certain system components are determined to be at fault; and
an ejection control indication of whether the digital data can be trusted to permit removal of a portable medium upon which the digital data is stored;
decrypting, at the computing device, the encrypted header digest with a public key that corresponds to the private key to recover the header digest;
creating a confirming header digest of the header that was distributed with the digital data, said confirming header digest being produced using a method identical to that employed in producing the header digest that was encrypted;
comparing the confirming header digest with the header digest that was recovered by decrypting;
producing a confirming section digest for each of the plurality of sections in the digital data by processing each of the plurality of sections of the digital data with a procedure identical to that previously used to produce the corresponding section digest included in the header,
comparing the confirming section digest for each of the plurality of sections with the corresponding section digest of the plurality of section digests in the header;
determining whether the security policy information enables the digital data to be used on the computing device; and
only enabling the digital data that were distributed along with the header and the encrypted header to be used on the computing device if:
the confirming header digest is identical to the header digest that was recovered;
the confirming section digest for said section is identical to the corresponding section digest for said section in the header; and
the digital data is allowed for use on the computing device based on the security policy information.

7. The method of claim 6, wherein if the step of comparing results in enabling the digital data to be used on the computing device, and if the security policy information does not allow the digital data to be used on the computing device, precluding the digital data from use on the computing device.

8. The method of claim 6, wherein the step of determining comprises the step of comparing the security information with a corresponding parameter that is set on the computing device, and if a result of the comparison confirms that the use is authorized, enabling the digital data to be used by the computing device, and if not, precluding the digital data from being used by the computing device.

9. The method of claim 8, further comprising the step of enabling an authorized user to enter and store a setting for a parameter that defines a rating of the digital data that the authorized user permits to be used on the computing device.

10. The method of claim 8, wherein the parameter is set before the computing device is provided to an end user.

11. One or more computer readable storage media having stored thereon instructions that, when executed on a computing device having one or more processors, configure the computing device to implement the steps recited in claim 6.

12. A method of enforcing a secure policy on distributed digital data which are intended to be used on a computing device, the method comprising the steps of:
(a) securing the digital data using the securing system prior to distribution by:
determining a data digest for the digital data in accord with a predefined procedure that produces the data digest in a form uniquely related to the digital data;
including the data digest in a header for the digital data;
including, in the header of the digital data, security policy information for controlling use of the digital data on the computing device, wherein the security policy information comprises:
an indication of a geographic region in which the digital data are authorized to be used;
an indication of a type of media from which the digital data are authorized to be loaded into the computing device for use, wherein the type of media is an optical storage disc;
a rating that is based upon at least one characteristic of the digital data;
a console system setting that must be in place prior to use of the digital data;
a fault tolerance indication of whether the digital data can be trusted when certain system components are determined to be at fault; and
an ejection control indication of whether the digital data can be trusted to permit removal of a portable medium upon which the digital data is stored;

determining a header digest for the header that includes the data digest using the predefined procedure, said header digest being uniquely related to the header; and encrypting the header digest using a private key that is secret;

(b) distributing, by the securing system, the encrypted header digest, the header having the security policy information, and the digital data;

(c) prior to use of the digital data on the computing device, the computing device confirming an authenticity of the digital data by:

decrypting the encrypted header digest using a public key that corresponds to the private key, to recover the header digest;

determining a confirmation digest of the header using the predefined procedure;

comparing the confirmation header digest of the header to the header digest that was recovered by the step of decrypting, to confirm whether the header that was distributed with the digital data was altered; and if not altered, determining a confirmation data digest of the digital data, corresponding to the data digest included in the header, using the predefined procedure; and comparing the confirmation data digest to the data digest included in the header, to confirm whether the digital data that were distributed have been altered after the step of securing;

(d) determining that the security policy information from the header enables the digital data to be used on the computing device, the determining comprising the computing device comparing indication of one or more criteria included in the security policy information with state of one or more corresponding criteria on the computing device for a match; and (e) preventing the computing device from farther using the digital data if one or more of the following occurs:

the confirmation header digest does not match the header digest that was recovered by the step of decrypting;

the confirmation data digest does not match the data digest that was included in the header; and the security policy information does not enable the digital data for use on the computing device.

13. The method of claim 12, wherein the step of securing the digital data prior to distribution comprises the steps of:

including the security policy information as part of the header when the predefined procedure is applied to the header to determine the header digest.

14. The method of claim 12, further comprising the step of enabling an authorized user to select the state of the one or more criteria on the computing device.

15. The method of claim 12, wherein the one or more criteria on the computing device are stored in a memory of the computing device and are not accessible or alterable by a user of the computing device.

16. The method of claim 12, wherein the predefined procedure comprises a hashing algorithm.

17. The method of claim 12, wherein the digital data are divided into a plurality of sections; and wherein the step of determining the data digest comprises the step of applying the predefined procedure to each section to produce a section digest for each section, all of said section digests together comprising the data digest.

18. The method of claim 17, wherein the step of determining a confirmation data digest of the digital data comprises the step of applying the predefined procedure to each section to produce a confirming section digest for each section, all of said confirming section digests together comprising the confirming data digest.

19. The method of claim 18, wherein the step of comparing the confirmation data digest to the data digest included in the header comprises the step of comparing each confirming section digest to its corresponding section digest in the header prior to using any digital data included therein.

20. The method of claim 19, wherein the step of preventing the computing device from further using the digital data comprises the step of preventing the computing device from using the digital data included in any section for which the confirming section digest does not match its corresponding section digest in the header.

21. One or more computer readable storage media having stored thereon instructions that, when executed on a computing device having one or more processors, configure the computing device to implement the steps recited in claim 12.

22. A method of enforcing a secure policy regarding use of digital data distributed for use on a computing device, the method comprising the steps of:

including with the digital data that are distributed, information to be applied by the computing device to enforce the secure policy regarding use of the digital data by the computing device, and an encrypted digest uniquely derived from a portion of the digital data that includes the information, wherein the information comprises:

an indication of a type of media from which the digital data are authorized to be loaded into the computing device for use;

a rating based upon at least one characteristic of the digital data; and a fault tolerance indication of whether the digital data can be trusted when certain system components are determined to be at fault; and the information further comprises one or more of:

an indication of a geographic region in which the digital data are authorized to be used;

a console system setting that must be in place prior to use of the digital data; and an ejection control indication of whether the digital data should be trusted to permit removal of an optical storage disc upon which the digital data is stored;

causing the computing device to decrypt the encrypted digest to recover the digest;

creating a confirmation digest with the computing device by using an identical technique that was previously used to create the digest that was previously encrypted;

comparing the confirmation digest with the digest that was decrypted; and if the confirmation digest matches the digest that was decrypted, using the information to enforce the secure policy regarding use of the digital data on the computing device, and if not, precluding use of the digital data on the computing device.

23. The method of claim 22, wherein the rating relates to a secure policy providing parental control of the digital data that are used on the computing device, further comprising the step of enabling only an authorized user to set a specific rating limit on the computing device, said specific rating limit being stored on the computing device and not readily altered by any unauthorized user.

24. The method of claim 23, wherein the specific rating limit corresponds to an age level rating that is compared to the rating indicated in the information, said digital data only being enabled for use on the computing device if the age level rating is not exceeded by the rating indicated by the information.

25. The method of claim 22, wherein the computing device comprises a game console and wherein the digital data comprise game software that is executed on the computing device, if enabled, so that a player can play the game software.

26. One or more computer readable storage media having stored thereon instructions that, when executed on a computing device having one or more processors, configure the computing device to implement the steps recited in claim 22.

27. A system for securing digital data so that a secure policy is enforced on the digital data to control its use on a computing device, the system comprising:
 a memory having stored thereon machine instructions; and
 a processor coupled to the memory, said processor executing the machine instructions, which configure the processor to carry out a plurality of functions, including:
  processing the digital data to create a data digest that uniquely corresponds to the digital data, wherein the digital data comprise a plurality of sections;
  including the data digest in a header of the digital data;
  processing each of the plurality of sections to produce a plurality of section digests uniquely corresponding to the plurality of sections of the digital data;
  including the plurality of section digests in the header;
  including, in the header of the digital data, information to be applied by the computing device to enforce the secure policy regarding use of the digital data by the computing device, wherein the information comprises one or more of:
   an indication of a geographic region in which the digital data are authorized to be used;
   an indication of a type of media from which the digital data are authorized to be loaded into the computing device for use, wherein the type of media is an optical storage disc;
   a console system setting that must be in place prior to use of the digital data;
   a fault tolerance indication of whether the digital data can be trusted when certain system components are determined to be at fault; and
   an ejection control indication of whether the digital data can be trusted to permit removal of a portable medium upon which the digital data is stored;
  processing the header that includes the data digest to create a header digest that uniquely corresponds to the header; and
  encrypting the header digest with a private key to produce an encrypted header digest, said private key having a corresponding public key that is provided when the digital data are to be used on the computing device, producing secured digital data that include the digital data, the header, and the encrypted header digest for distribution and use on the computing device.

28. The system of claim 27, wherein the machine instructions cause the processor to implement a hashing algorithm to produce the data digest and the header digest, respectively.

29. The system of claim 27, wherein the information to be applied by the computing device to enforce the secure policy regarding use of the digital data by the computing device is included within the header from which the header digest is created.

30. The system of claim 27, further comprising a removable non-volatile storage medium that is coupled to the processor, wherein the machine instructions further cause the processor to store the digital data with the encrypted header on the removable medium.

31. The system of claim 27, wherein the machine instructions cause the processor to transmit the digital data with the encrypted header over at least one of a wire and a wireless communication network, for use by the computing device.

32. A system for authenticating digital data, so as to ensure that the digital data have not been altered and so as to enforce secure policies regarding use of the digital data, said digital data being distributed along with a header and with an encrypted header digest for the digital data that was produced by encrypting the header digest with a private key, the system comprising:
 a memory having stored thereon machine instructions; and
 a processor coupled to the memory, said processor executing the machine instructions, which configure the processor to carry out a plurality of functions, including:
  decrypting the encrypted header digest with a public key that corresponds to the private key, to recover the header digest having information to be applied by the system to enforce the secure policies regarding use of the digital data at the system, the digital data comprising a plurality of sections, the header including a plurality of session digests each uniquely corresponding to one of the plurality of sections of the digital data that was produced prior to distribution of the digital data, wherein the information comprises one or more of:
   an indication of a geographic region in which the digital data are authorized to be used;
   an indication of a type of media from which the digital data are authorized to be loaded into the computing device for use, wherein the type of media is an optical storage disc;
   a console system setting that must be in place prior to use of the digital data;
   a fault tolerance indication of whether the digital data can be trusted when certain system components are determined to be at fault; and
   an ejection control indication of whether the digital data can be trusted to permit removal of a portable medium upon which the digital data is stored;
  creating a confirming header digest of the header that was distributed with the digital data, said confirming header digest being produced in accord with the machine instructions that carry out a method identical to that employed in producing the header digest that was encrypted;
  comparing the confirming header digest with the header digest that was recovered by decrypting;
  producing a confirming section digest for each of the plurality of sections by processing each of the plurality of sections of the digital data with a procedure identical to that previously used to produce the corresponding section digest in the header;
  comparing the confirming section digest for each of the plurality of sections with the corresponding section digest of the plurality of sections digests in the header;
  determining that the secure policies enable the digital data to be used on the system, the determining comprising comparing indication of one or more parameters included in the secure policies with state of one or more corresponding parameters on the system for a match; and
  only enabling the digital data to be used on the system if:

the confirming header digest is identical to the header digest that was recovered;

the confirming section digest for said section is identical to the corresponding section digest for said section included in the header; and the digital data is allowed for use on the system based on the secure policies.

33. The system of claim 32, wherein the one or more corresponding parameters on the system are set in the memory of the system.

34. The system of claim 33, wherein the machine instructions enable an authorized user to enter and store a setting in the memory for a parameter that defines a rating of the digital data that the authorized user permits to be used on the system.

35. The system of claim 33, wherein the one or more parameters on the system are set before the system is made available for use by an end user.

36. A system for enforcing a secure policy regarding use of digital data distributed for use on the system, said digital data including information to be applied by the system to enforce the secure policy regarding use of the digital data on the system and an encrypted digest, a digest that was encrypted to provide the encrypted digest being uniquely derived from a portion of the digital data that includes the information, comprising:

a memory having stored thereon a plurality of machine instructions; and a processor coupled to the memory and which executes the machine instructions, configuring the processor to carry out the following functions:

decrypting the encrypted digest to recover the digest having a plurality of parameters to be applied by the system to enforce the secure policy regarding use of the digital data at the system, wherein the plurality of parameters comprise:

an indication of a geographic region in which the digital data are authorized to be used;

an indication of a type of media from which the digital data are authorized to be loaded into the computing device for use;

a rating that is based upon at least one characteristic of the digital data;

a console system setting that must be in place prior to use of the digital data;

a fault tolerance indication of whether the digital data can be trusted when certain system components are determined to be at fault; and an ejection control indication of whether the digital data can be trusted to permit removal of a portable medium upon which the digital data is stored;

creating a confirmation digest, using an identical technique that was previously used to create the digest that was previously encrypted;

comparing the confirmation digest with the digest that was decrypted; and if the confirmation digest matches the digest that was decrypted, using the information to enforce use of the digital data on the system in accord with the secure policy, and if not, precluding use of the digital data on the system, wherein the using the information to enforce use of the digital data on the system comprises comparing each of the plurality of parameters with a corresponding parameter on the system for a match.

37. The system of claim 36, wherein the rating relates to a secure policy providing parental control of the digital data that are used on the system, further comprising the step of enabling only an authorized user to set a specific rating limit on the system, said specific rating limit being stored in the memory and not readily altered by an unauthorized user.

38. The system of claim 37, wherein the specific rating limit corresponds to an age level rating that is compared to the rating indicated in the information, said digital data only being enabled for use on the system if the age level rating is not exceeded by the rating indicated by the information.

39. The system of claim 36, wherein the system comprises a game console and wherein the digital data comprise game software that is executed on the computing device, if enabled, so that a player can play the game software.

* * * * *

UNITED STATES PATENT AND TRADEMARK OFFICE
CERTIFICATE OF CORRECTION

| | | |
|---|---|---|
| PATENT NO. | : 7,627,753 B2 | Page 1 of 1 |
| APPLICATION NO. | : 10/101999 | |
| DATED | : December 1, 2009 | |
| INVENTOR(S) | : Jon Marcus Randall Whitten et al. | |

It is certified that error appears in the above-identified patent and that said Letters Patent is hereby corrected as shown below:

In column 17, line 37, in Claim 12, delete "farther" and insert -- further --, therefor.

Signed and Sealed this

Twenty-fifth Day of January, 2011

David J. Kappos
*Director of the United States Patent and Trademark Office*